United States Patent
Kanehisa et al.

(10) Patent No.: US 7,461,904 B2
(45) Date of Patent: Dec. 9, 2008

(54) BICYCLE HUB SEALING STRUCTURE

(75) Inventors: Takanori Kanehisa, Sakai (JP); Atsuhiro Nishimura, Sakai (JP)

(73) Assignee: Shimano Inc., Osaka (JP)

( * ) Notice: Subject to any disclaimer, the term of this patent is extended or adjusted under 35 U.S.C. 154(b) by 41 days.

(21) Appl. No.: 11/154,813

(22) Filed: Jun. 17, 2005

(65) Prior Publication Data

US 2006/0284475 A1 Dec. 21, 2006

(51) Int. Cl.
*B60B 27/02* (2006.01)
*F16J 15/32* (2006.01)

(52) U.S. Cl. .................... 301/110.5; 277/551

(58) Field of Classification Search ........... 301/110.5; 192/64; 277/551, 571, 572, 371; 305/103, 305/104
See application file for complete search history.

(56) References Cited

U.S. PATENT DOCUMENTS

| | | | |
|---|---|---|---|
| 4,763,957 A * | 8/1988 | Poehlmann et al. ...... 301/110.5 |
| 6,202,813 B1 | 3/2001 | Yahata et al. |
| 6,260,681 B1 | 7/2001 | Chen |
| 6,322,155 B1 | 11/2001 | Chen |
| 6,325,386 B1 | 12/2001 | Shoge |
| 6,352,314 B1 | 3/2002 | Tabe |
| 6,386,644 B2 * | 5/2002 | Chen .................... 301/110.5 |
| 6,588,564 B1 * | 7/2003 | Jager et al. ................. 192/64 |
| 6,827,497 B2 | 12/2004 | Chen |
| 7,044,564 B2 * | 5/2006 | Chen .................... 301/110.5 |
| 2005/0110221 A1 * | 5/2005 | Oates ..................... 277/549 |

FOREIGN PATENT DOCUMENTS

| | | |
|---|---|---|
| EP | 1447241 | 8/2004 |
| JP | 2001-334806 A | 12/2001 |
| KR | 10-0299786 B1 | 6/2001 |
| KR | 2003-0093645 A | 12/2003 |
| TW | 443277 U | 6/2001 |
| TW | 481114 U | 3/2002 |
| TW | 524761 B | 3/2003 |
| TW | 534004 U | 5/2003 |
| WO | WO99/04988 | 2/1999 |

* cited by examiner

*Primary Examiner*—Jason R Bellinger
*Assistant Examiner*—Kip T Kotter
(74) *Attorney, Agent, or Firm*—Global IP Counselors, LLP

(57) ABSTRACT

A bicycle hub assembly includes a hub shell, a freewheel body and a sealing structure there between. The sealing structure includes a seal that has a lip that extends in an axial direction to engage a radially extending surface on the sealing plate. In one embodiment, the seal is installed in a seal retaining portion formed on the hub shell. In another embodiment, the seal is installed on the freewheel and contacts a radially extending surface on the hub shell.

18 Claims, 11 Drawing Sheets

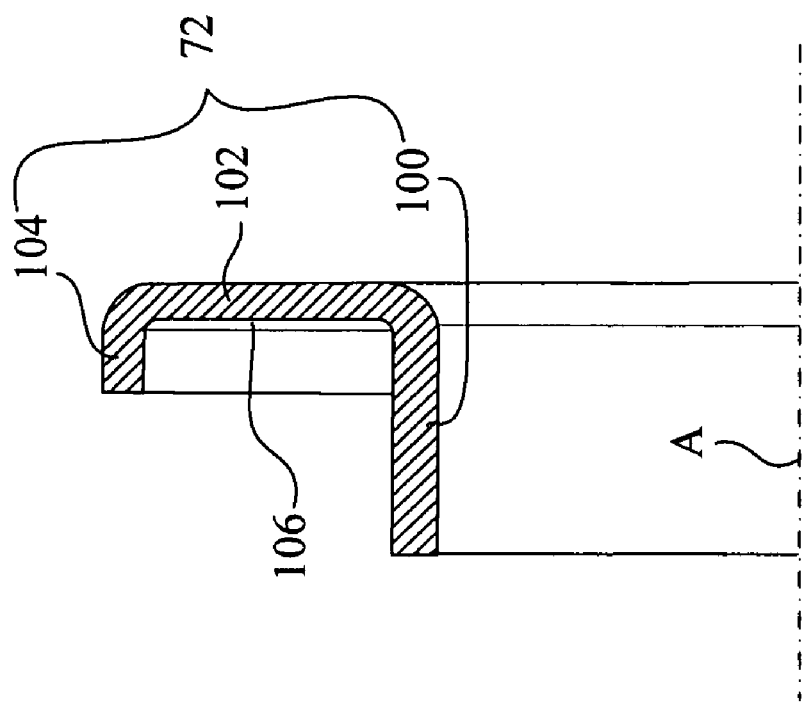
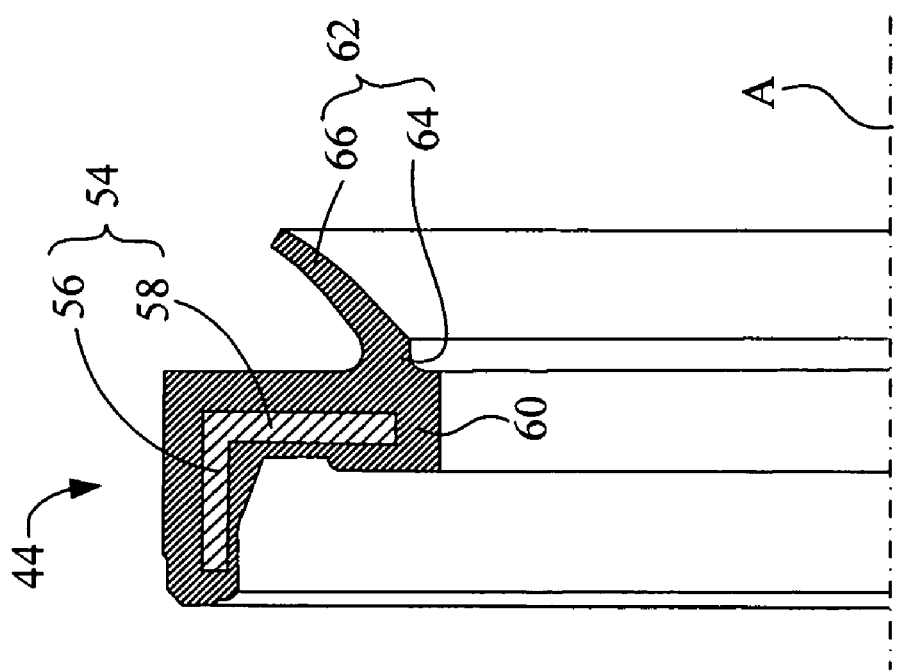
Fig. 9
Fig. 8

BICYCLE HUB SEALING STRUCTURE

BACKGROUND OF THE INVENTION

1. Field of the Invention

This invention generally relates to a bicycle hub sealing structure. More specifically, the present invention relates to bicycle hub sealing structure that includes a seal with a sealing lip that extends generally in an axial direction into engagement with a radially extending surface.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle hub assembly and its various features.

The bicycle hub assembly typically includes a hub shell and a freewheel body that are arranged to rotate relative to one another. In order to protect the internal parts therebetween, a seal is typically provided between the hub shell and the freewheel. The seal has a lip that extends in a radial direction, radially inward against an annular axially extending surface. As a result of the pedaling force exerted on the gear sprockets which are supported on the freewheel body, a shaft supporting the freewheel body will often flex allowing the freewheel body to undergo displacement in radial directions relative to the hub shell. Such movement is generally perpendicular to the axis of rotation. Such flexing puts stress on the seal.

In view of the above, it will be apparent to those skilled in the art from this disclosure that there exists a need for an improved seal structure that allows for flexing of the freewheel body relative to the hub shell. This invention addresses this need in the art as well as other needs, which will become apparent to those skilled in the art from this disclosure.

SUMMARY OF THE INVENTION

One object of the present invention is to provide a sealing structure that provides a reliable seal between a hub shell of a hub assembly and a freewheel body supported by the hub assembly.

Another object of the present invention is to provide a simple and reliable hub assembly structure.

The foregoing objects can basically be attained by providing a bicycle hub assembly with a hub shell, a freewheel and a seal member between the hub shell and the freewheel. Preferably, the freewheel is supported on the hub shell for rotational movement with respect to the hub shell. One of either the hub shell or the freewheel has a radially extending surface. The other of either the hub shell or the freewheel has a seal retaining portion formed thereon. The seal member is retained in the seal retaining portion and a portion of the seal contacts the radially extending surface forming a seal between the hub shell and the freewheel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a partial cross sectional view of the seal shown removed from the hub assembly, in accordance with the first embodiment of the present invention;

FIG. 9 is a partial cross sectional view of the seal plate shown removed from the hub assembly in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Definitions:

The term "radially extending surface" as used herein is a surface that extends radially outward away from the axis of rotation of a rotatable body, such as the axis of rotation of an axle of a bicycle or a bicycle hub. A radially extending surface as used herein can be a surface that is perpendicular to the axis of rotation or can be inclined with respect to a plane perpendicular to the axis of rotation. However, a radially extending surface, as used herein, is a surface that does not extend in a direction parallel to the axis of rotation.

The term "axially extending surface" as used herein is a surface that extends in a direction generally parallel to the axis of rotation of a rotatable body. An axially extending surface can be an annular surface extending around a shaft or can be a contoured or flat surface that is generally parallel to the axis of rotation and has at least a portion thereof that is parallel to the axis of rotation.

The terms "axially extending" and "axial direction" as used herein is refer to a direction that is generally parallel to the axis of rotation or slightly inclined from a direction parallel to the axis of rotation.

The term "radially extending" and "radial direction" as used herein refers to a direction that is generally perpendicular to the axis of rotation or slightly inclined from a direction generally perpendicular to the axis of rotation. Further, the term "radially extending" is a direction that is not parallel to the axis of rotation.

The term "joined" or "joining", as used herein, encompasses configurations in which an element is directly secured to another element by affixing the element directly to the other element; configurations in which an element is indirectly secured to another element by affixing the element to intermediate member(s) which in turn are affixed to the other element; and configurations in which is one element is integral with another element, i.e. one element is essentially part of the other element. This definition also applies to words of similar meaning, for example, the terms "attached", "fixed" and their derivatives.

First Embodiment

Figure 1:
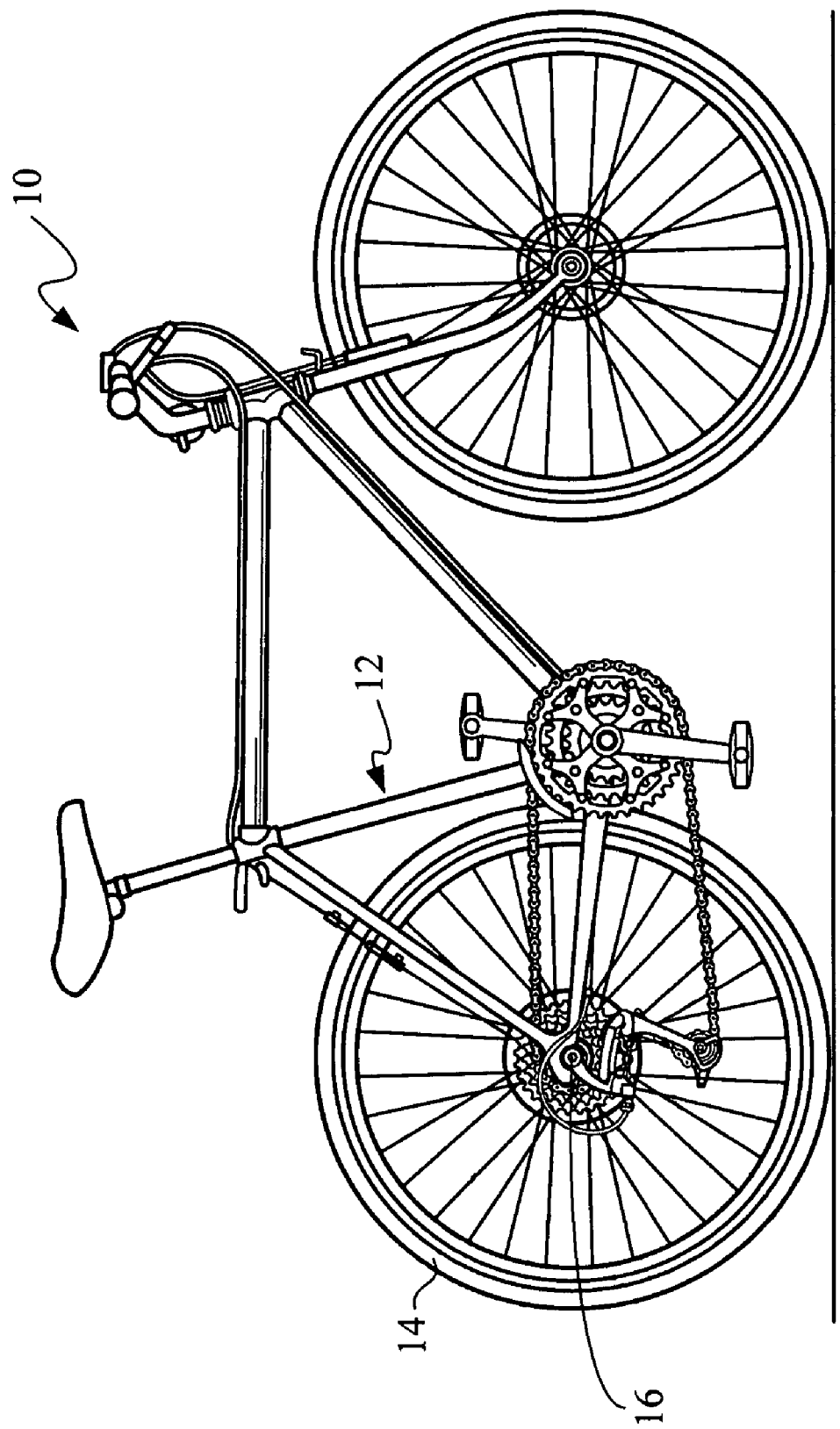
FIG. 1 is a side elevational view of a bicycle that includes a hub assembly sealing structure in accordance with the present invention.

Referring initially to FIG. 1, a bicycle 10 is illustrated in accordance with a first embodiment of the present invention. The bicycle 10 includes a frame 12, a rear wheel 14 and a hub assembly 16 that supports the rear wheel 14 on the frame 12.

Figure 2:
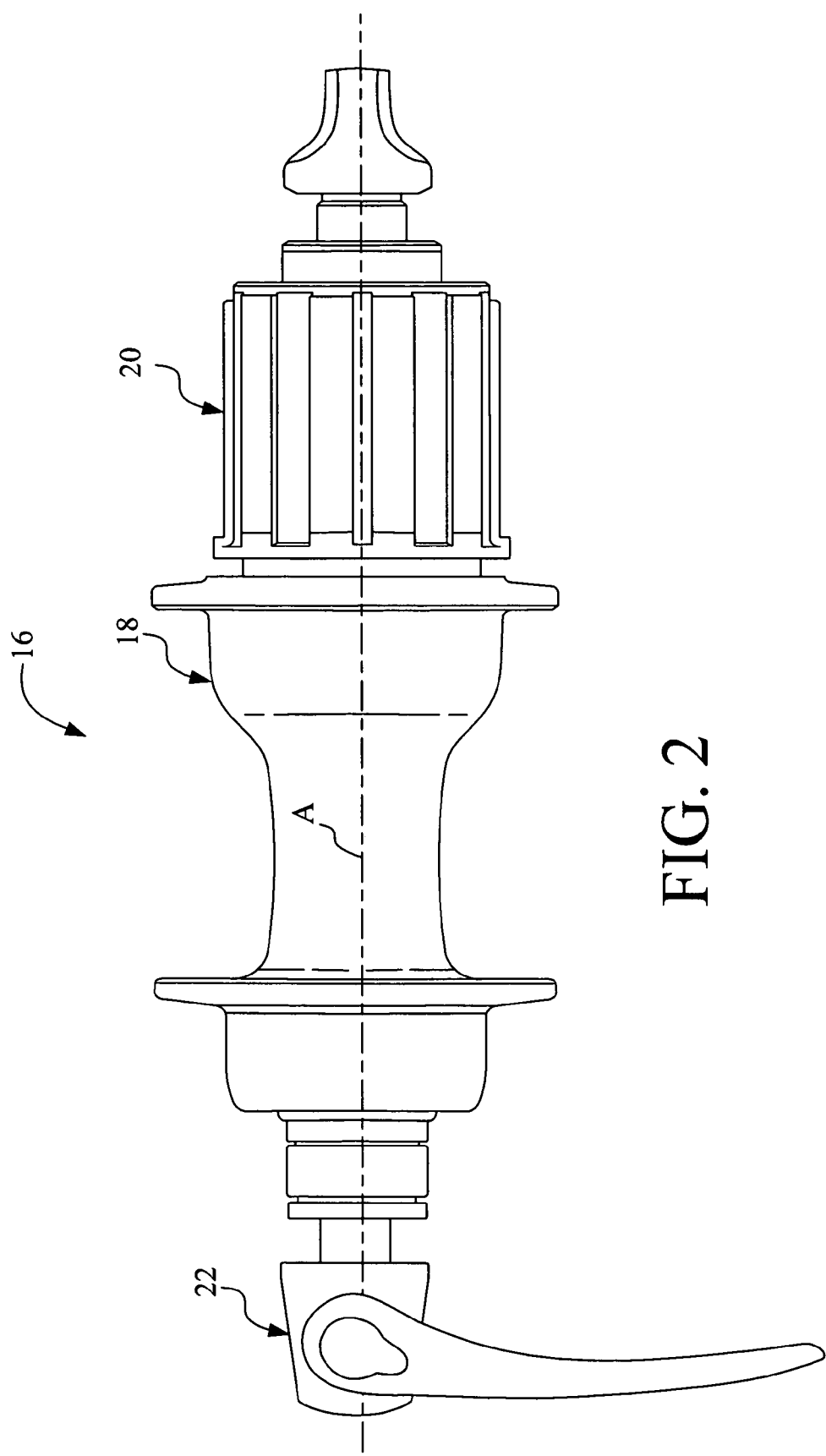
FIG. 2 is a side elevational view of a hub assembly that includes the sealing structure in accordance with the present invention.
Figure 4:
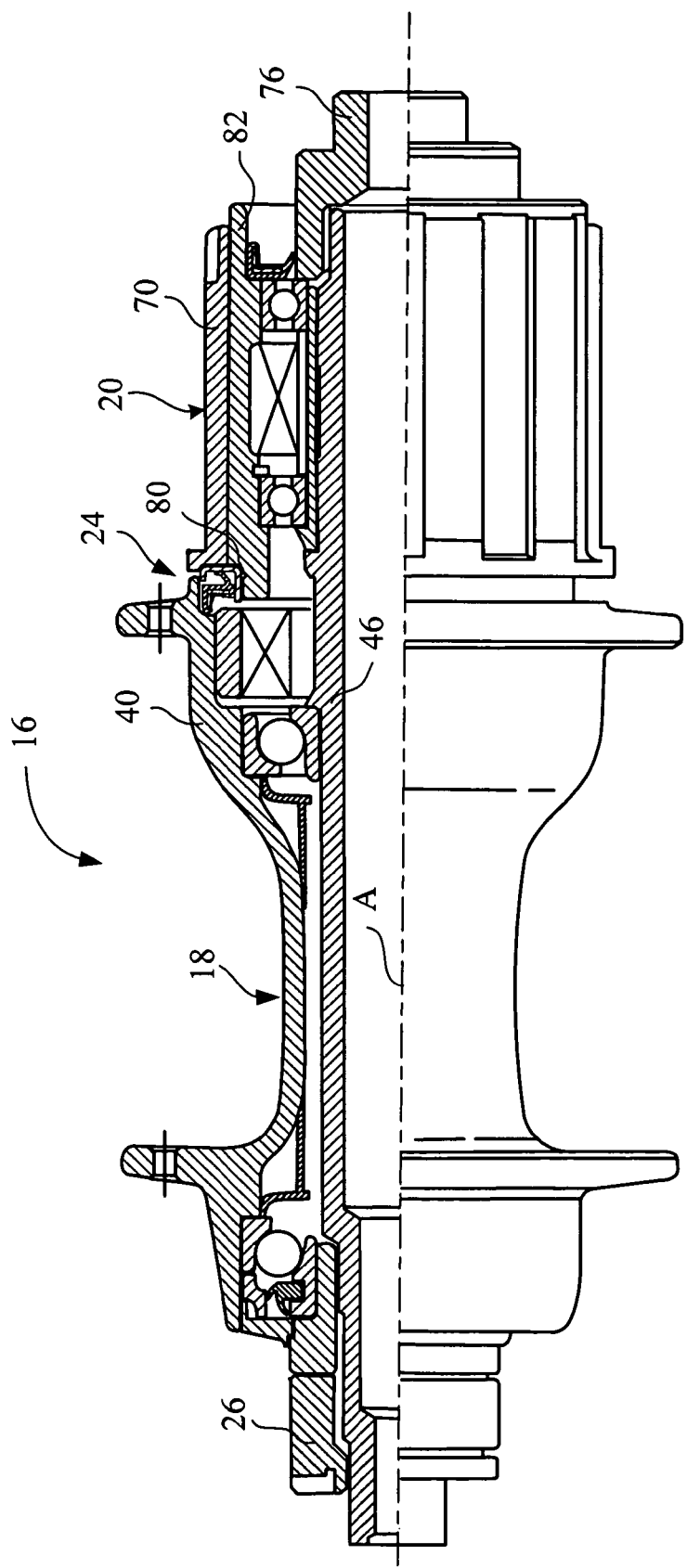
FIG. 4 is a part elevation, part cross-section of the hub assembly showing the sealing structure in accordance with the first embodiment of the present invention.
Figure 5:
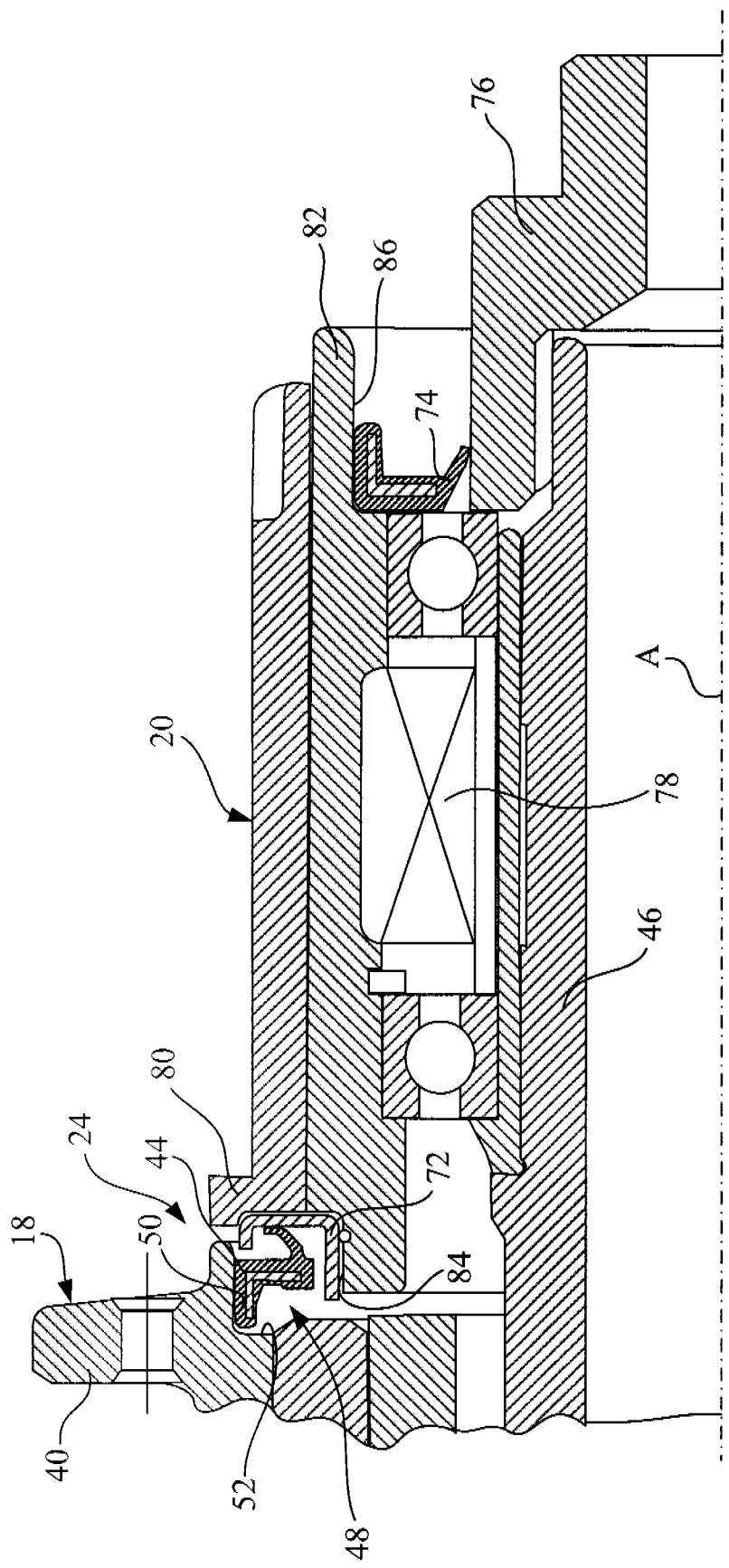
FIG. 5 an enlarged fragmentary cross-sectional view of the hub assembly showing hub shell, a freewheel body, a seal and a seal plate in accordance with the first embodiment of the present invention.

The hub assembly 16 basically includes a hub portion 18, a freewheel portion 20 and a quick release assembly 22. Preferably, the hub portion 18 and the freewheel portion 20 are removably secured on the bicycle frame 12 by the quick release assembly 22. The freewheel portion 20 and the hub portion 18 are rotatable with respect to one another about an axis of rotation A that is defined within the hub assembly 16, as indicated in FIGS. 2, 4 and 5. The hub assembly 16 also includes a seal structure 24 (FIGS. 4, 5 and 7) that provides a seal between the hub portion 18 and the freewheel portion 20, as is described in greater detail below.

Figure 3:
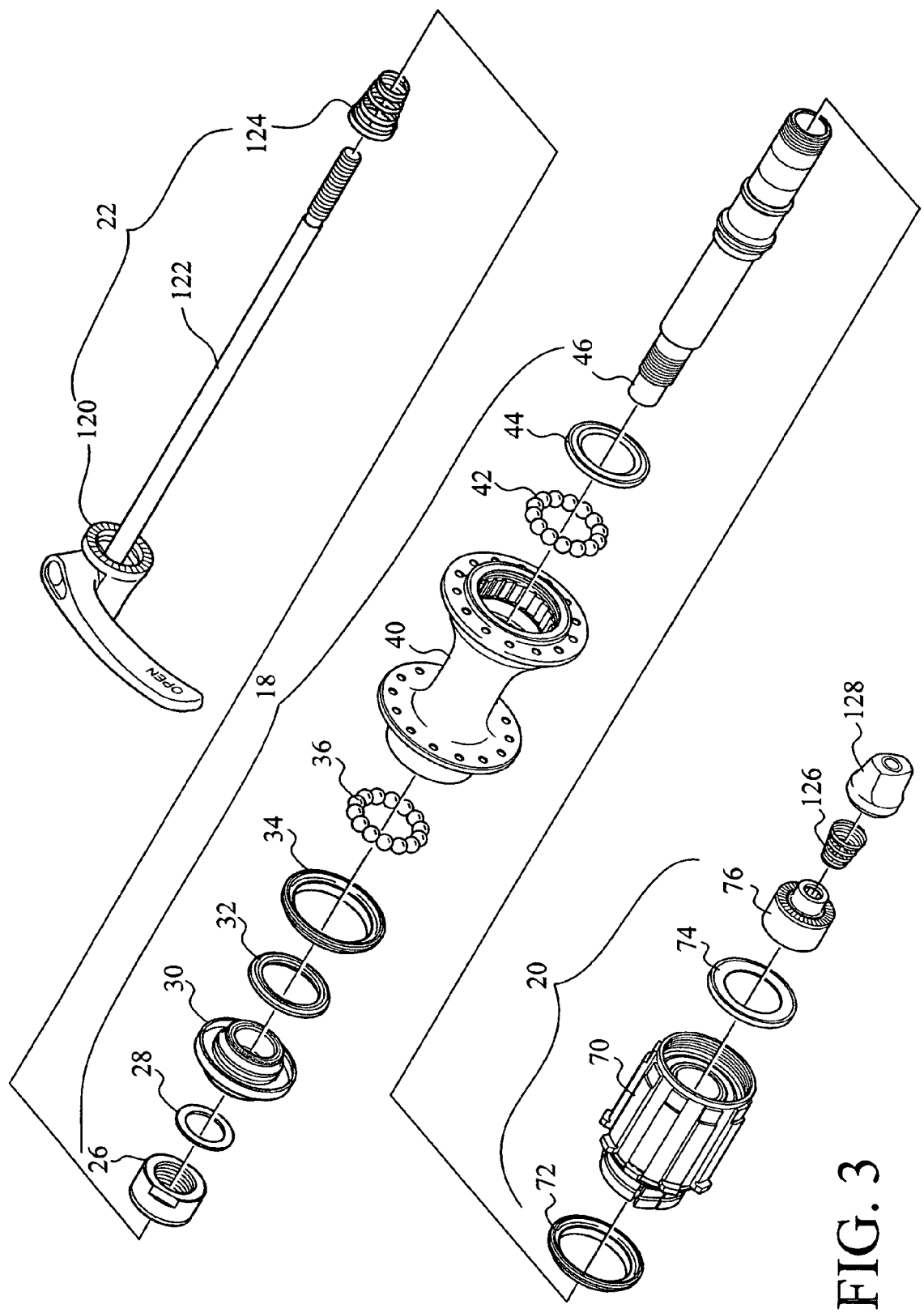
FIG. 3 is an exploded view of the hub assembly in accordance with a first embodiment of the present invention.

As shown in FIG. 3, the hub portion 18 basically includes a lock nut 26, a spacer 28, a dust/seal ring 30, an axial seal 32, a dust cap 34, a first bearing 36, a hub shell 40, a second bearing 42, a seal 44 and a hub axle 46. The hub shell 40 rotates relative to the hub axle 46. The lock nut 26, the spacer 28, the dust/seal ring 30, the axial seal 32, the dust cap 34, the first bearing 36, the second bearing 42 and the hub axle 46 are conventional elements known in the art, and therefore description of this elements is omitted for brevity.

Figure 7:
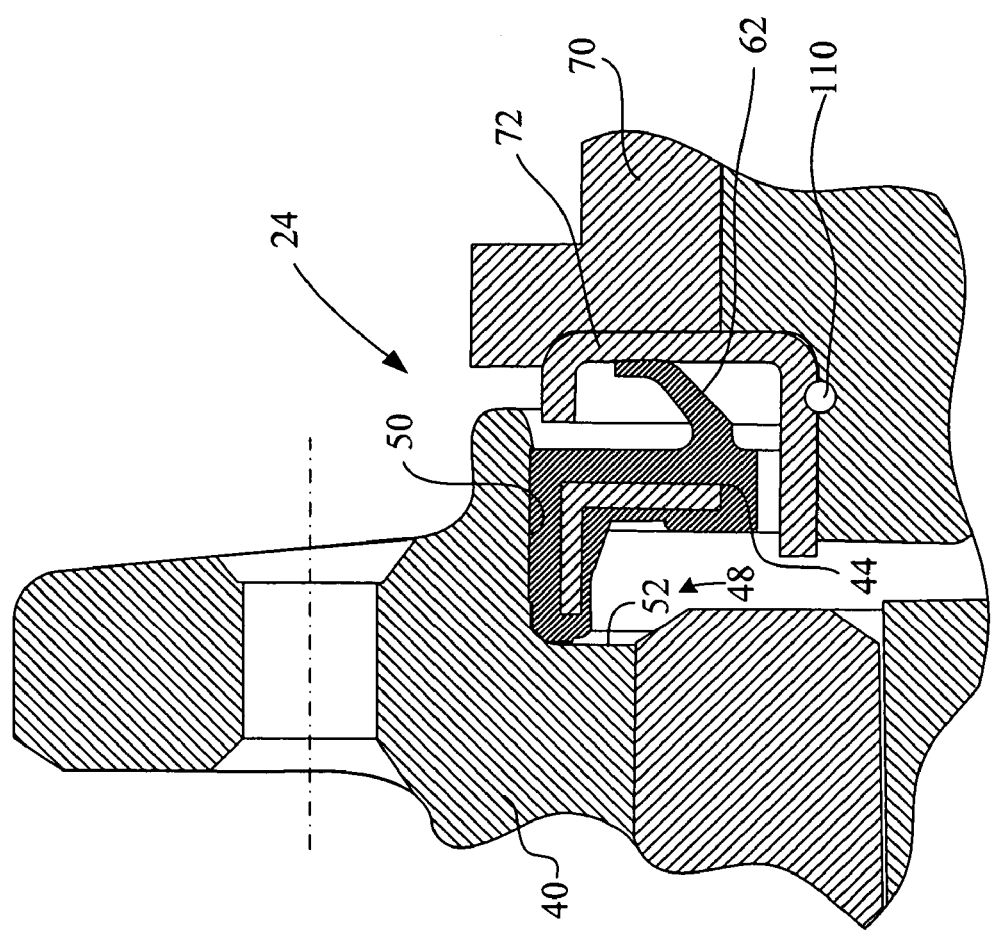
FIG. 7 another enlarged fragmentary cross-section showing the seal structure between the hub shell and the freewheel body in accordance with the first embodiment of the present invention.
Figure 11:
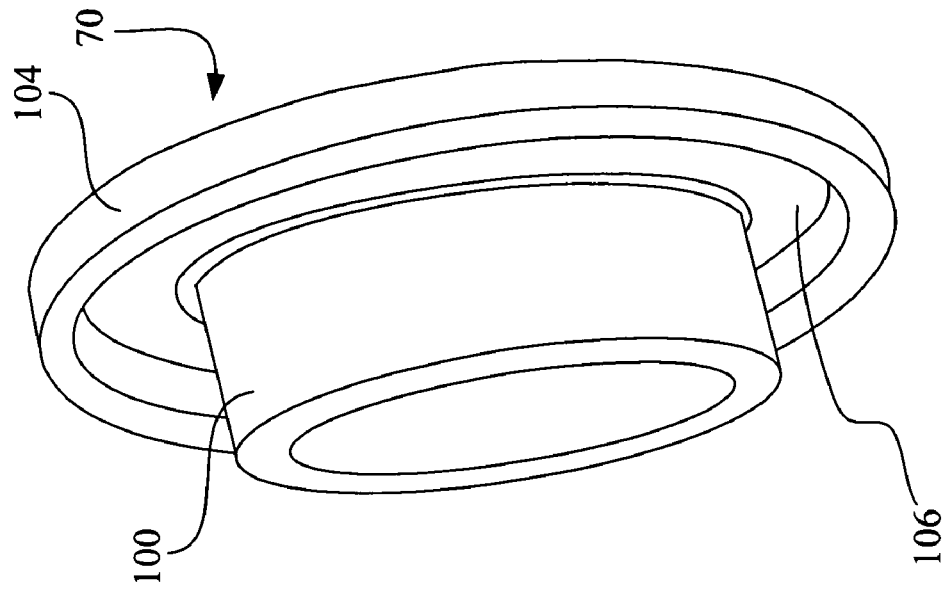
FIG. 11 is a perspective view of the seal plate shown removed from the hub assembly in accordance with the first embodiment of the present invention.
Figure 10:
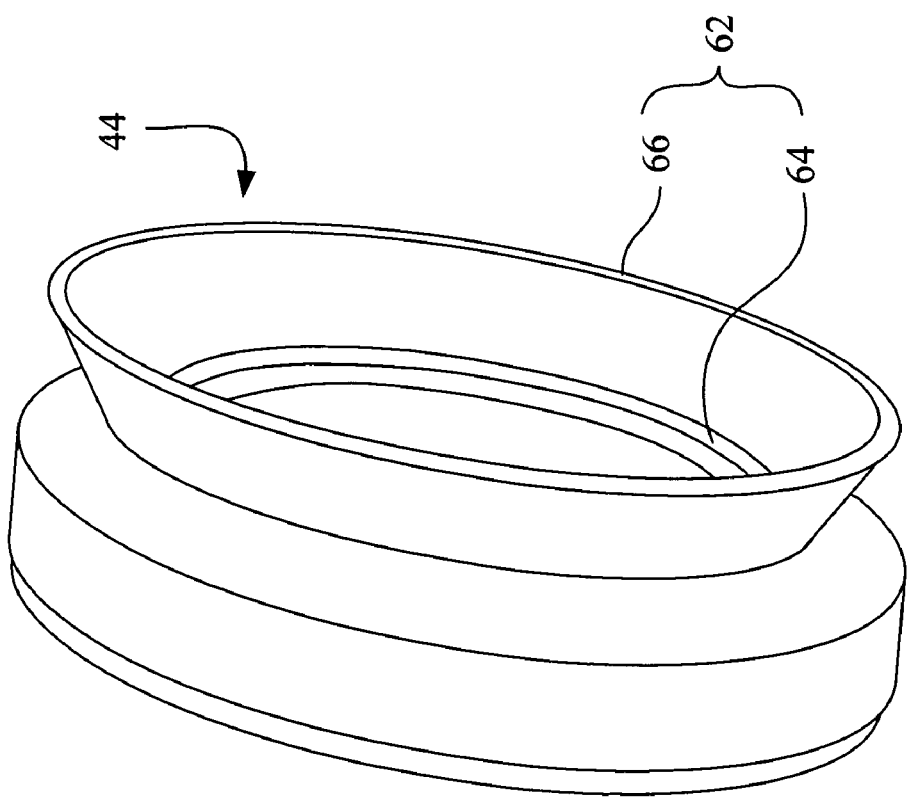
FIG. 10 is a perspective view of the seal shown removed from the hub assembly, in accordance with the first embodiment of the present invention.
Figure 12:
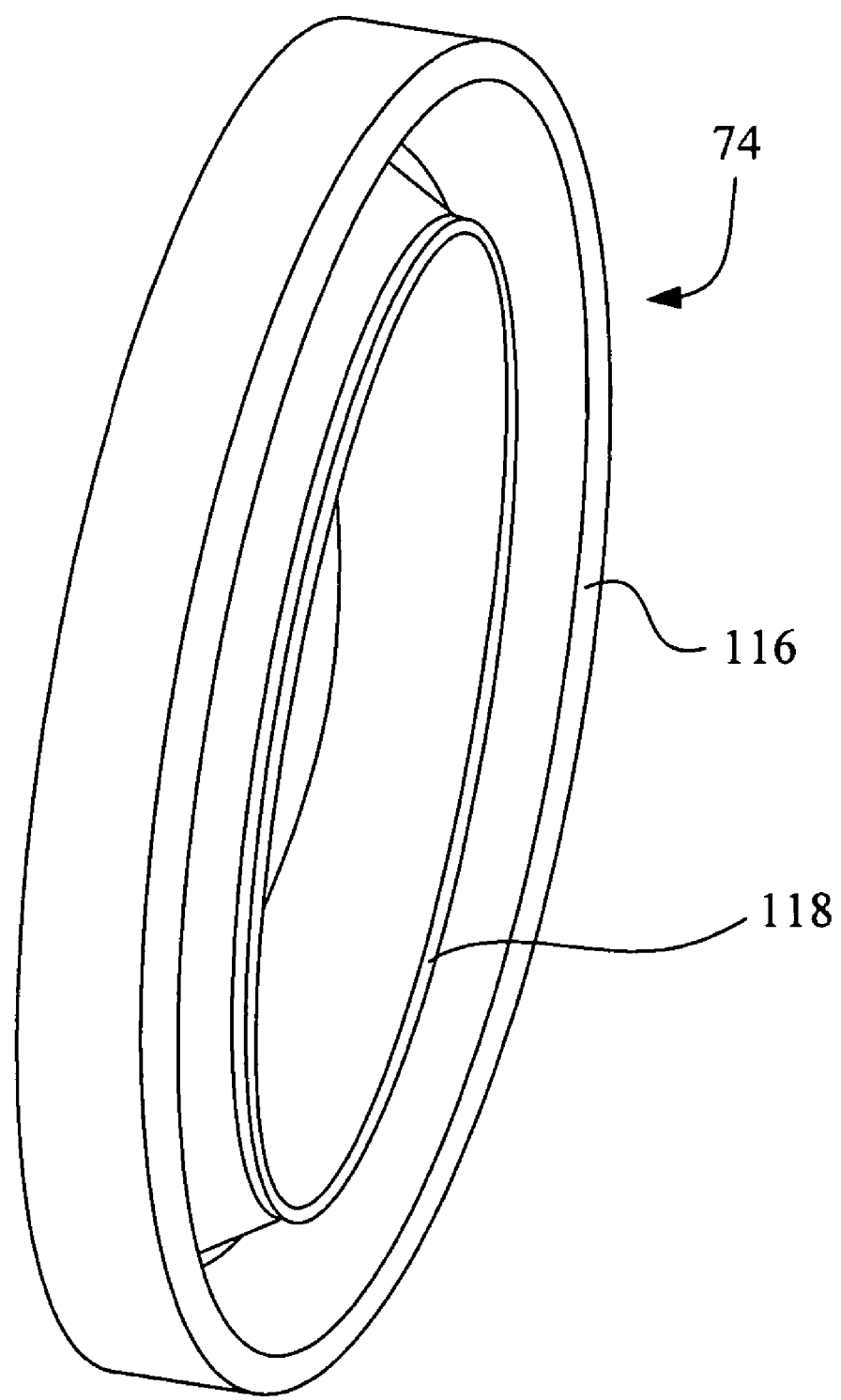
FIG. 12 is a perspective view of the second seal shown removed from the hub assembly in accordance with the first embodiment of the present invention.

As shown more clearly in FIGS. 5 and 7, the hub shell 40 is formed with a seal retaining portion 48 that includes an axially extending surface 50 and a radially extending surface 52. The hub shell 40 is preferably made of aluminum or an aluminum alloy. As indicated in FIGS. 7 and 8, the axially extending surface 50 is an annular surface that extends around a portion of the inner periphery of the hub shell 40 adjacent to the freewheel portion 20.

The seal 44 forms a first part of the seal structure 24 of the present invention. As shown in FIGS. 5, 7, 8, 9 and 10, the seal 44 preferably includes a core plate 54 that has an annular portion 56 and a flange portion 58, an outer seal body 60 and a lip portion 62. As shown in cross-section in FIG. 8, the flange portion 58 of the core plate 54 extends radially inwardly from the annular portion 56 and is generally perpendicular to the annular portion 56. Preferably, the outer seal body 60 completely surrounds and encircles the core plate 54 to form the annular shape of the seal 44. The core plate 54 is preferably a metallic metal ring made of a steel or aluminum material. The outer seal body 60 and the lip portion 62 are preferably formed from a plastic, polymer or rubber material that has a small degree of flexibility or resiliency. However, it should be understood from the description herein and drawings that the lip portion 62 and the outer seal body 60 can be separate elements that are fixed or joined to one another via intermediate members or directly to one another.

The lip portion 62 is basically an annular protrusion that is joined with the outer seal body 60 in a unitary manner. Specifically, the lip portion 62 and the outer seal body 60 are formed as a single structure and preferably made of the same material. The lip portion 62 includes a proximal end 64 and a distal end 66. At the proximal end 64, the lip portion 62 extends in an axially direction away from the outer seal body 60 but becomes inclined going toward the distal end 66. Specifically, the distal end 66 is inclined outwardly away from the axis of rotation A at an angle of anywhere from 20 degrees to 60 degrees. In the depicted embodiment, the lip portion 62 is inclined at the distal end 66 at an angle of approximately 45 degrees or less with respect to the axis of rotation A. Further, as shown in FIGS. 5 and 7, the distal end 66 of the lip portion 62 is disposed radially outward from the proximal end 64. It should further be understood from the drawings and the disclosure that the proximal end 64 and the distal end 66 are annular in shape.

As shown in FIGS. 5 and 7, the seal 44 is fixedly fitted into the seal retaining portion 48 of the hub shell 40. Specifically, the outer seal body 60 is preferably force fitted into contact with the axially extending surface 50 of the seal retaining portion 48. The annular portion 56 of the core plate 54 conforms to the shape of the axially extending surface 50 of the seal retaining portion 48 to allow for press fitting therein. Further, as is shown in FIG. 8, in an uninstalled state, the lip portion 62 has a generally uniform, straight shape. However, once installed in the seal retaining portion 48, the distal end 66 of the lip portion 62 is slightly deformed (FIG. 7).

Figure 6:
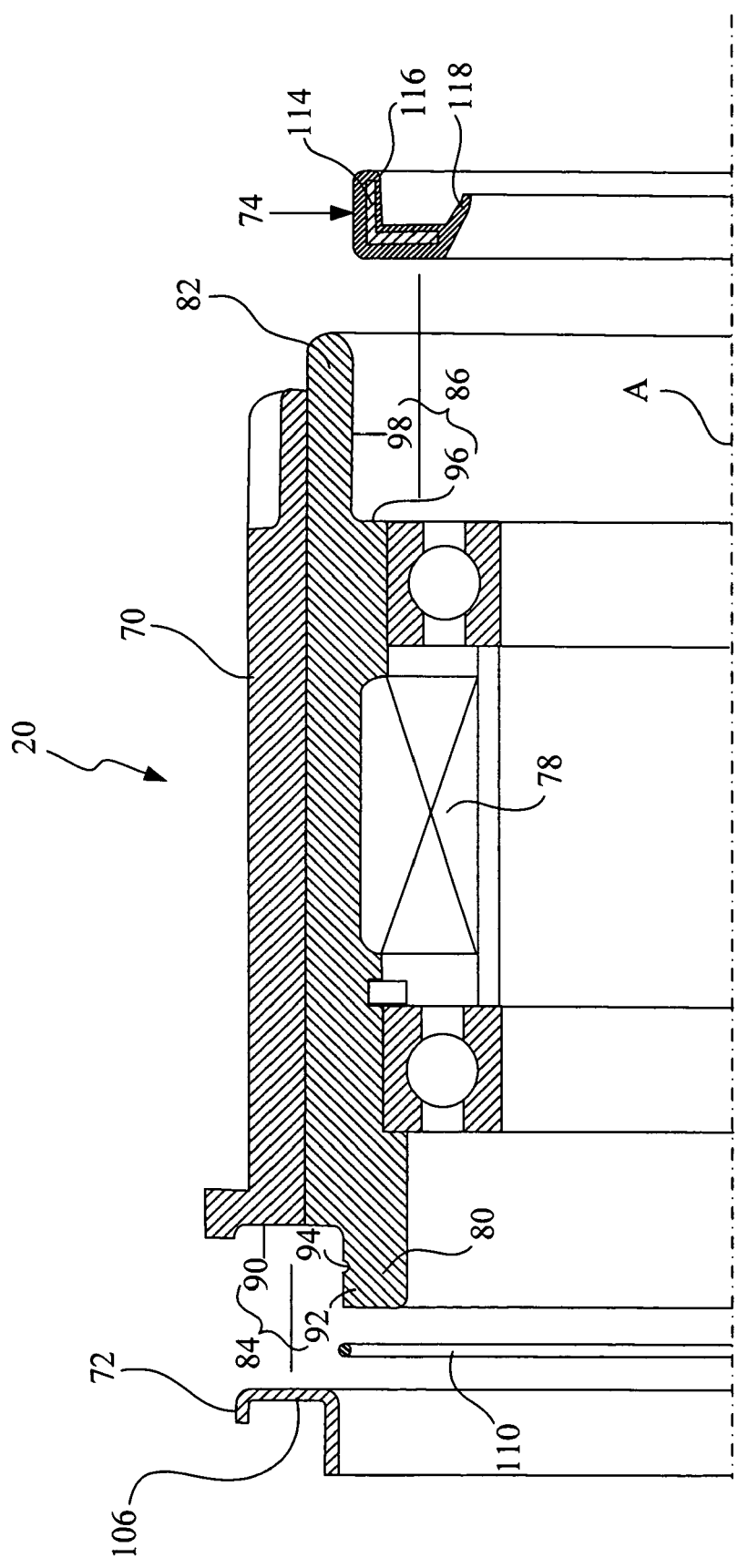
FIG. 6 an enlarged exploded view of the freewheel body showing details of the freewheel body, the seal, the seal plate and a second seal in accordance with the first embodiment of the present invention.

As is shown in FIG. 3, the freewheel portion 20 is supported on the hub axle 46 for rotational movement with respect to the hub shell 40 in a conventional manner. As shown in FIG. 6, the freewheel portion 20 basically includes a freewheel body 70 rotating relative to the hub axle 46, a lock nut 76 (FIGS. 3 and 5) and a one-way clutch 78, and preferably, the freewheel portion 20 includes a seal plate 72 and an outer seal 74. Therefore, according to the present invention, a structure where the seal 44 directly contacts with the freewheel body 70 to form a seal between the hub portion 18 and the freewheel portion 20 can also be taken without the seal plate 72. The lock nut 76 and one-way clutch 78 are conventional elements generally known in the art and therefore description is omitted for brevity.

The freewheel body 70 is preferably made of a stainless steel material, but can also be formed from a steel material that has been provided with surface hardening or a hardened outer metal surface, such as chrome. As shown in FIG. 6, the freewheel body 70 has a hub end 80 and an outer end 82. The hub end 80 is formed with a first annular recess 84 and the outer end 82 is formed with a second annular recess 86.

The first annular recess 84 includes a radially extending surface 90 and an axially extending surface 92. The axially extending surface 92 is formed with an o-ring receiving depression 94. Alternatively, the O-ring receiving depression 94 may be formed on the radially extending surface 90.

The second annular recess 86 is formed with a radially extending surface 96 and an axially extending surface 98.

The seal plate 72 forms a second part of the seal structure 24 of the present invention, and is shown more clearly in FIGS. 6, 7, 9 and 11. The seal plate 72 and the seal 44 form a labyrinth sealing structure between the hub shell 40 and the freewheel portion 20. The seal plate 72 is preferably made of a stainless steel material. In view of weight reduction for a hub assembly, it is advantageous that a hub shell and/or a freewheel body are make of aluminum. However, if a structure where the seal 44 directly contacts with the radially extending surface 90 to form a seal between the hub portion 18 and the freewheel portion 20 is taken, such an aluminum contacting surface (i.e., the radially extending surface 90 of a freewheel made of aluminum) tends to undesirably damage (more specifically, to wear away) the seal 44. Using a seal plate 72 made of a stainless steel material efficiently prevents undesirable wear-out of a seal 44 during rotation even if a freewheel body is made of aluminum for weight reduction. With specific reference to FIG. 9, the seal plate 72 basically includes an annular inner portion 100, a radially extending wall 102 and an annular outer lip 104. The radially extending wall 102 defines a radially extending surface 106 that is partially confined by the annular inner portion 100 and the annular outer lip 104. Specifically, the seal 44 in combination with the annular inner portion 100 and the annular outer lip 104 of the seal plate 72 define the labyrinth sealing structure between the hub shell 40 and the freewheel portion 20, as shown more clearly in FIGS. 5 and 7. The labyrinth sealing freewheel portion 20, as shown more clearly in FIGS. 5 and 7. The labyrinth sealing structure created by the seal 44 and the seal plate 72 prevents the ingress of debris and moisture into the bearings 42 within the hub shell 40.

As shown in FIGS. 5, 6 and 7, the seal plate 72 is press fitted into the first annular recess 84 preferably with an O-ring 110 installed into the O-ring receiving depression 94. Once installed, the annular inner portion 100 of the seal plate 72 engages the axially extending surface 92 of the first annular recess 84, slightly deforming the O-ring 110 therebetween. The O-ring 110 further ensures a tight seal therebetween in order to prevent the ingress of debris and moisture into a gap between the seal plate 72 and the first annular recess 84. Further, the radially extending wall 102 of the seal plate 72 contacts the radially extending annular surface 90 of the first annular recess 84.

With the hub assembly 16 fully assembled, the distal end 66 of the lip portion 62 of the seal 44 is urged against the radially extending surface 106 of the seal plate 72. As indicated in FIG. 7, the lip portion 62 is slightly deformed, and being made of a resilient material is biased into firm contact with the radially extending surface 106 of the seal plate 72, ensuring a reliable seal. The lip portion 62 applies a biasing force against the radially extending surface 106 in an axial direction. Further, the lip portion 62 of the seal 44 can easily slide on the radially extending surface 106 of the seal plate 72 during relative rotation between the hub portion 18 and the freewheel portion 20. Therefore the seal therebetween is not easily compromised by deflections in the radial direction of the freewheel portion 20 with respect to the hub portion 18 (generally perpendicular to the axis of rotation A). Thus, a reliable seal between the hub portion 18 and the freewheel portion 20 is ensured. Futher, the sealing capability of the seal structure 24 according to the present invention is enhanced without undesirably increasing rotational torque of the freewheel body 70 with respect to the hub shell 40 (in other words, low-torque/high-sealing function can be achieved).

As shown in FIG. 6, the outer seal 74 includes a core plate 114, an outer seal body 116 and a lip portion 118. The core plate 114 is preferably made of metallic material that is completely surrounded by the outer seal body 116. The outer seal body 116 is preferably made of a resilient material, such as a rubber or polymer based material. The lip portion 118 extends radially inwardly at an angle of approximately 45 degrees.

The outer seal 74 is press-fitted into the second annular recess 86 in engagement with both the radially extending annular surface 96 and the axially extending surface 98. With the hub assembly 16 fully assembled, the lip portion 118 of the outer seal 74 engages an outer periphery of the lock nut 76. The lip portion 118 preferably is biased radially inwardly against the axially extending outer periphery of the lock nut 74. Because of the low-torque/high-sealing function of the seal structure 24 according to the present invention, rotational torque of the freewheel portion 20 with respect to the hub portion 18 does not undesirably increase in total even if the outer seal 74 is additionally disposed on the second annular recess 86.

The quick release assembly 22 basically includes a quick release handle 120, a shaft portion 122, a first spring 124, a second spring 126 (shown at bottom of FIG. 3) and a release nut 128 (also shown at bottom of FIG. 3). Since the features of the quick release assembly 22 are conventional and know in the art, description is omitted for brevity. The hub portion 18, the freewheel portion 20 and the quick release assembly 22 are generally assembled in a conventional manner.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Second Embodiment

Figure 13:
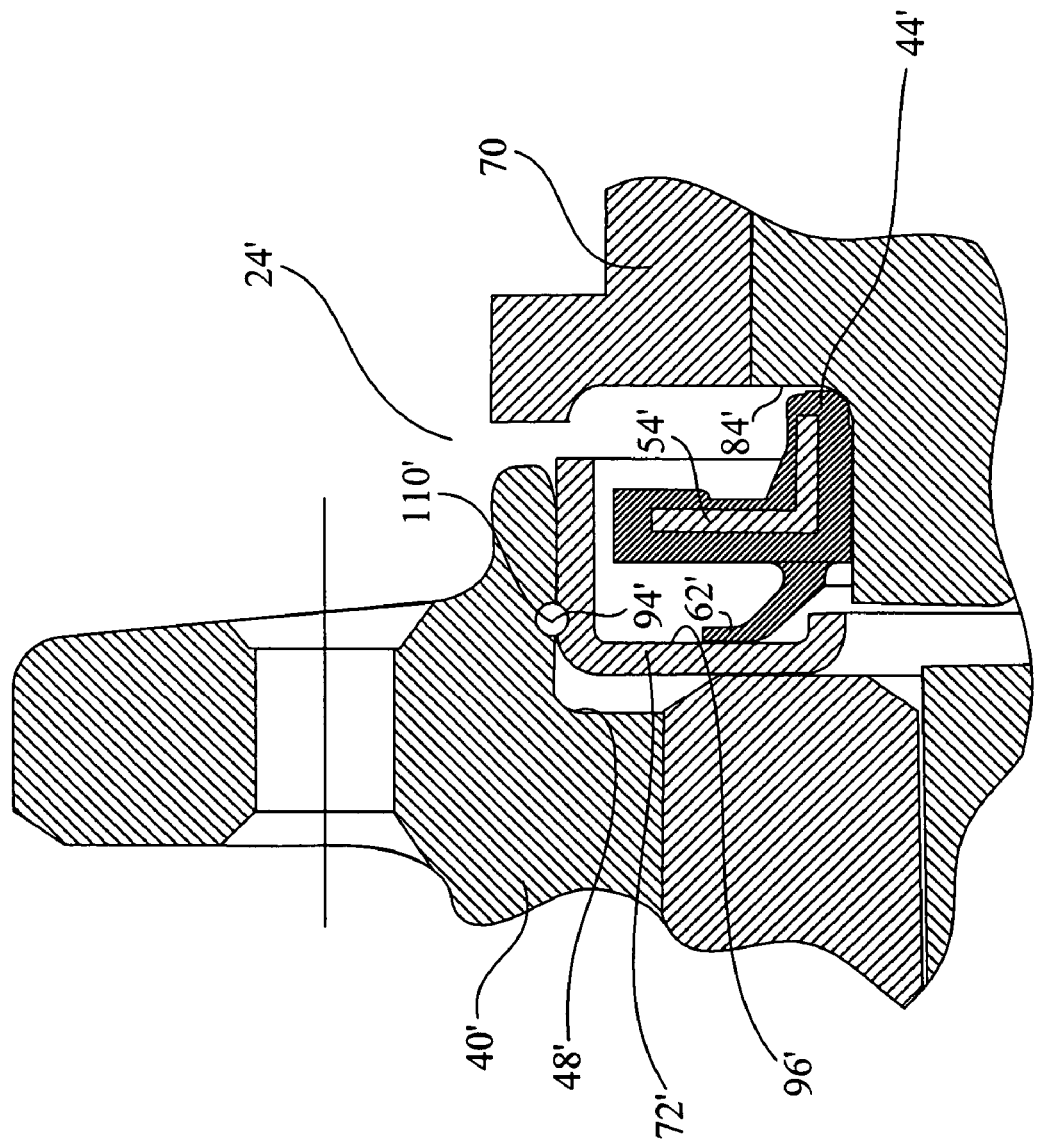
FIG. 13 is an enlarged fragmentary cross-sectional view of a sealing structure in accordance with the second embodiment of the present invention.

Referring now to FIG. 13, a seal structure 24' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

As shown in FIG. 13, the seal structure 24' includes a seal 44' with a core plate 54' and a seal plate 72'. The seal 44' and the seal plate 72' are in positions that are reversed, when compared to the first embodiment. Specifically, the seal 44' is press-fitted into a first annular recess 84' of the freewheel body 70. In the second embodiment, the first annular recess 84' serves as a seal retaining portion of the freewheel body 70. Further, the seal plate 72' is press fitted into a seal plate retaining portion 48' formed in the hub shell 40'. The seal plate retaining portion 48' is formed with an O-ring recess 94' that receives an O-ring 110'.

The seal 44' and the seal plate 72' form a labyrinth seal structure where a lip portion 62' of the seal 44' extends in an axial direction into sliding engagement with a radially extending surface 96' of the seal plate 72'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub assembly comprising:
   a hub shell;
   a freewheel supported on the hub shell for rotational movement with respect to the hub shell;
   one of either the hub shell or the freewheel having a radially extending sealing surface defined thereon;
   the other of either the hub shell or the freewheel having a seal retaining portion formed thereon including an axially extending surface; and
   a seal member including an annular base portion, a flange portion extending from the annular base portion and a lip portion extending from the flange portion, with one of the annular base portion and the flange portion defining a maximum outer diameter and the other of the annular base portion and the flange portion defining a minimum inner diameter in which an annular radial space is formed between the one of the hub shell and the freewheel having the radially extending sealing surface and one of the maximum outer diameter and the minimum inner diameter of the seal member.
   the annular base portion being non-movably retained against the axially extending surface in the seal retaining portion and axially spaced from the radially extending sealing surface, the annular base portion being perpendicularly arranged with respect to the flange portion,
   the flange portion having a first end extending from the annular base portion and a second end supporting the lip portion such that the lip portion is cantilevered with respect to the flange portion, and
   the lip portion extending outwardly from the second end of the flange portion with a distal end portion of the lip portion of the seal member relatively rotatably contacting the radially extending sealing surface such that only the distal end portion of the lip portion contacts the one of the hub shell and the freewheel having the radially extending sealing surface.

2. The bicycle hub assembly as set forth in claim 1 wherein the seal retaining portion is formed on the hub shell.

3. The bicycle hub assembly as set forth in claim 1 wherein the seal retaining portion is formed on the freewheel.

4. The bicycle hub assembly as set forth in claim 1 wherein the seal member includes a core plate that conforms to a shape of the seal retaining portion for press fitting therein.

5. The bicycle hub assembly as set forth in claim 4 wherein at least a portion of the core plate is disposed within the annular base portion of the seal member.

6. The bicycle hub assembly as set forth in claim 4 wherein at least a portion of the core plate is disposed within the flange portion of the seal member.

7. The bicycle hub assembly as set forth in claim 4 wherein the core plate includes an annular base portion and a flange portion perpendicular to the annular base portion, the annular base portion of the core plate being disposed in the annular base portion of the seal member and the flange portion of the of the core plate being disposed with the flange portion of the seal member.

8. The bicycle hub assembly as set forth in claim 1 wherein the lip portion of the seal member includes a proximal end, the proximal end being joined to the flange portion, and the distal end arranged and configured to contact the radially extending sealing surface so that the distal end is positioned radially outwardly from the proximal end.

9. The bicycle hub assembly as set forth in claim 1 further comprising:
   a seal plate attached to one of either the hub shell or the freewheel, the seal plate having the radially extending sealing surface formed thereon for sliding contact with the seal member.

10. The bicycle hub assembly as set forth in claim 9 wherein
    the seal member forms a labyrinth sealing structure between the hub shell and the freewheel in cooperation with the seal plate.

11. The bicycle hub assembly as set forth in claim 9 wherein
    the seal plate is made of a stain-less steel material and at least one of the hub shell and the freewheel is made of aluminum.

12. The bicycle hub assembly as set forth in claim 9 wherein the seal plate is press fitted into a portion of the freewheel.

13. The bicycle hub assembly as set forth in claim 12 wherein an O-ring is disposed between the seal plate and the portion of the freewheel.

14. The bicycle hub assembly as set forth in claim 12 wherein the seal member is press fitted into a portion of the hub shell.

15. The bicycle hub assembly as set forth in claim 9 wherein the seal plate is press fitted into a portion of the hub shell.

16. The bicycle hub assembly as set forth in claim 15 wherein an O-ring is disposed between the seal plate and the portion of the hub shell.

17. The bicycle hub assembly as set forth in claim 15 wherein the seal member is press fitted into a portion of the freewheel.

18. The bicycle hub assembly as set forth in claim 1 further comprising:
    a second seal member disposed proximate an outer end of the freewheel.

* * * * *